W. H. RICHARDS.
PNEUMATIC TIRE.
APPLICATION FILED AUG. 5, 1920.
1,386,204.
Patented Aug. 2, 1921.
4 SHEETS—SHEET 4.
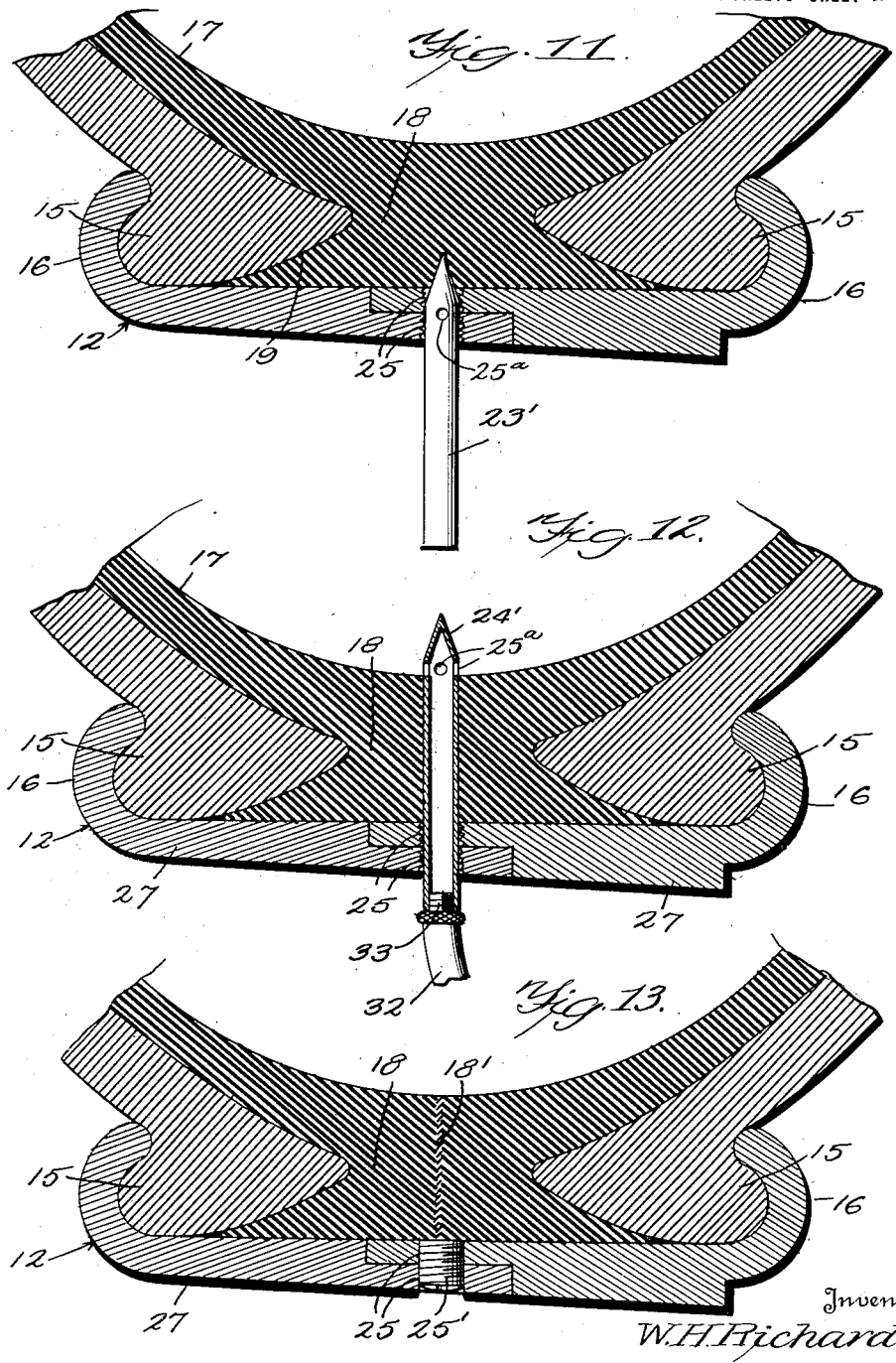
Inventor
W. H. Richards
By B. P. Wishburne
Attorney

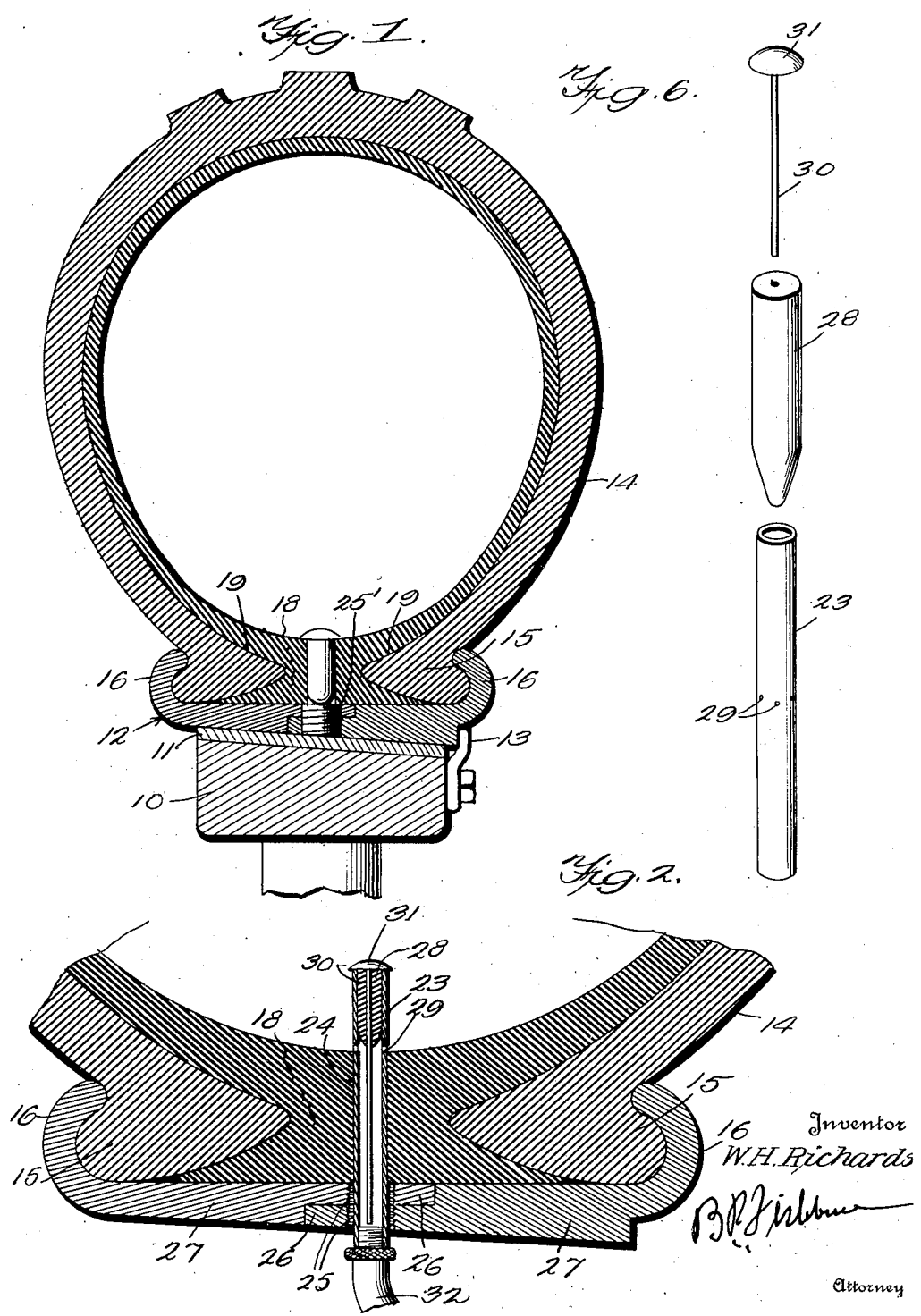

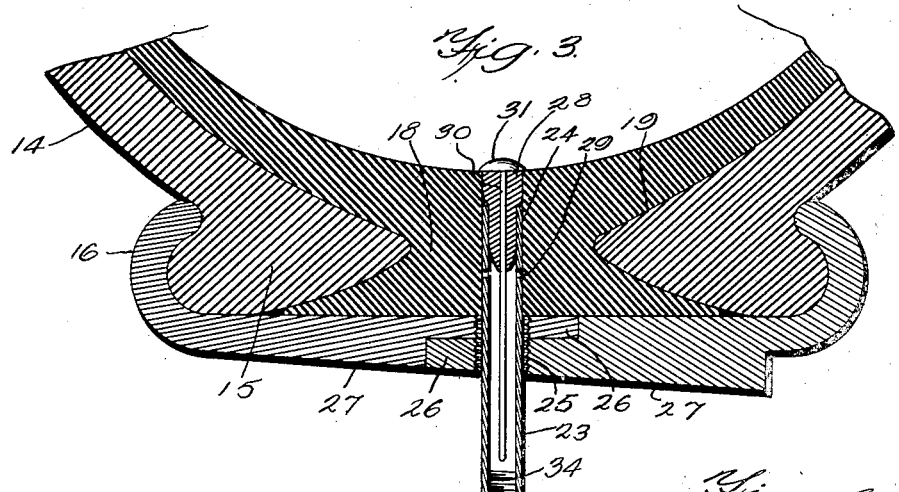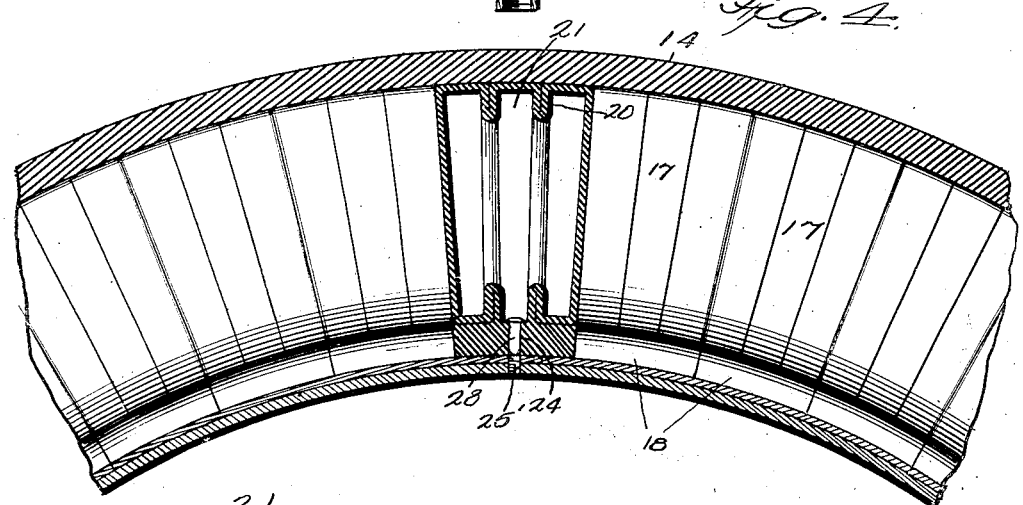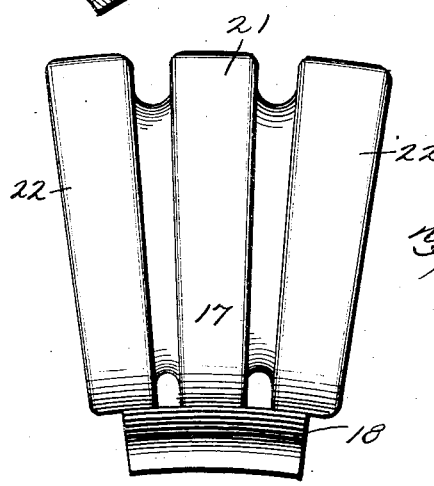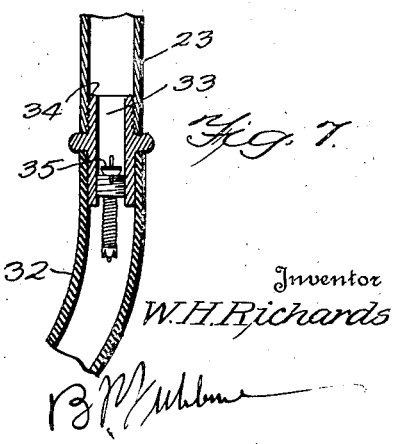

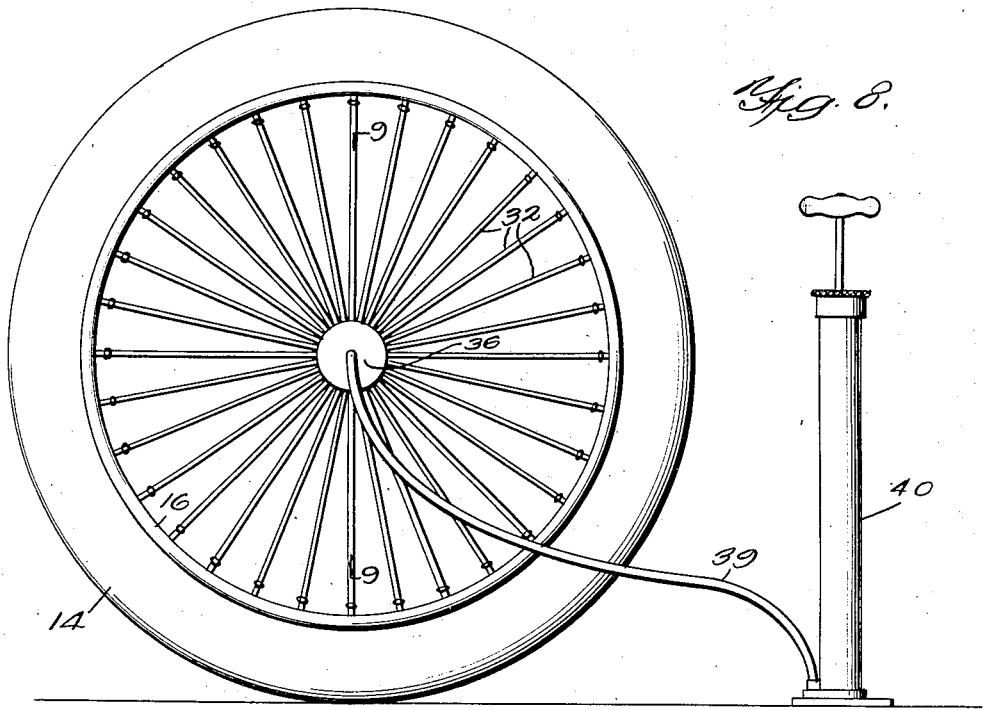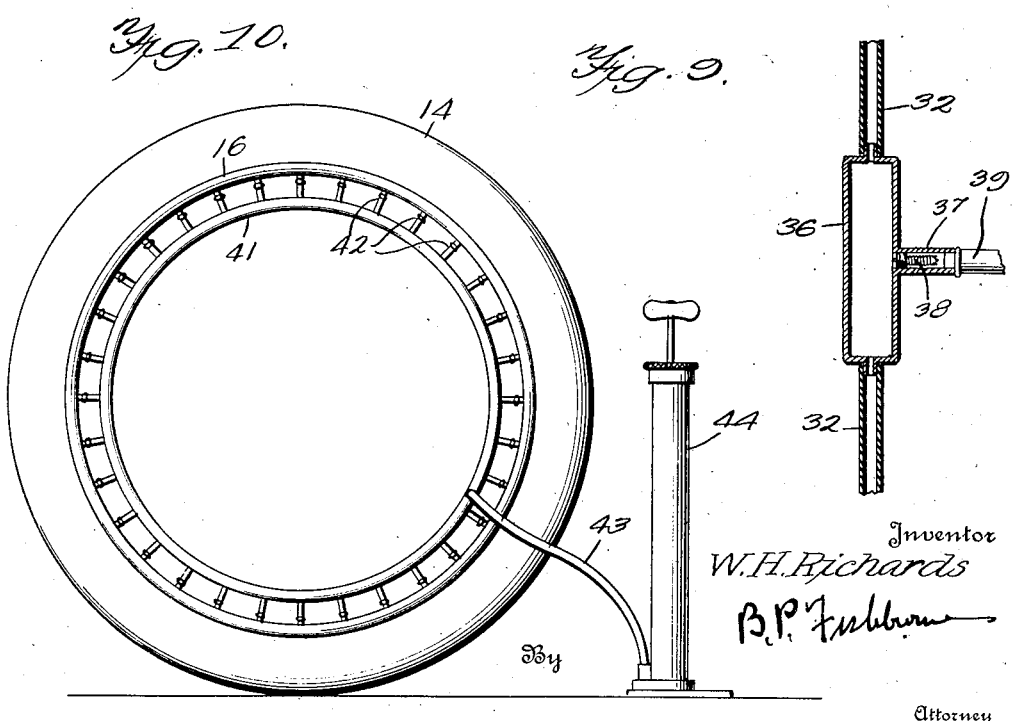

UNITED STATES PATENT OFFICE.

WILLIAM H. RICHARDS, OF KNOXVILLE, TENNESSEE.

PNEUMATIC TIRE.

1,386,204.  Specification of Letters Patent.  Patented Aug. 2, 1921.

Application filed August 5, 1920. Serial No. 401,370.

*To all whom it may concern:*

Be it known that I, WILLIAM H. RICHARDS, citizen of the United States, residing at Knoxville, in the county of Knox and State of Tennessee, have invented certain new and useful Improvements in Pneumatic Tires, of which the following is a specification.

My invention relates to improvements in pneumatic tires, of the multi-cell type.

An important object of my invention is to provide means for simultaneously introducing compressed air into the several cells, at the same degree of pressure, with means to subsequently properly seal the individual cell.

A further object of the invention is to provide individual cells, having a bead engaging portion, such cells being circumferentially expansible, whereby two of the cells, upon the collapsing of a cell between them, are adapted to laterally expand, to fill the space produced by the collapsing cell.

A further object of the invention is to provide a demountable rim, for receiving and holding the tire, such rim embodying sections having openings formed therein through which the valve tubes pass to the individual cells, such openings being adapted to be covered after the removal of the valve tube, by plugs, serving to secure the rim sections together.

Other objects and advantages of the invention will be apparent during the course of the following description.

In the accompanying drawings forming a part of this specification, and in which like numerals are employed to designate like parts throughout the same, Figure 1 is a transverse section through a tire embodying my invention, the valve being in the closed position, Fig. 2 is a similar view, parts broken away, with the valve in the open position, Fig. 3 is a similar view with the valve partly closed, preparatory to the removal of the valve tube, Fig. 4 is a section through the tire, in its plane of rotation, certain cells in section and other cells in elevation, Fig. 5 is a side elevation of one cell, expanded, Fig. 6 is a perspective view of the elements embodied in the valve device, Fig. 7 is a detail section through one end of the radial inflating tube, Fig. 8 is a side elevation of the tire and inflating means therefor, Fig. 9 is a transverse section taken on line 9—9 of Fig. 8, Fig. 10 is a side elevation of a slightly different form of inflating means, Fig. 11 is a fragmentary transverse section through a slightly different form of cell and inflating means embodied in the invention, Fig. 12 is a similar view, showing the valve tube forced through the heel of the cell with the apertures uncovered, and, Fig. 13 is a similar view with the valve tube removed and the opening cemented closed.

In the drawings, wherein for the purpose of illustration, are shown preferred embodiments of my invention, the numeral 10 designates the felly of a wheel, (common to all forms of the invention) equipped with a permanent rim 11, to receive thereon a demountable rim 12, held in place by cleats 13 or the like.

The numeral 14 (Figs. 1 to 13, inclusive) designates a tire casing, preferably formed of the usual construction, having beads 15, spaced as shown, and held within the flanges 16 of the demountable rim.

Arranged within the tire casing 14 are a plurality of individual cells 17 (Figs. 1 to 5, inclusive, 11 to 13), having inner bead engaging portions or heels 18. Each cell is preferably formed of rubber, and the bead engaging portion 18 is preferably formed integral therewith, and is also formed of rubber, possessing a suitable degree of elasticity and compressibility. The opposite sides of each portion 18, Figs. 1 to 11, is provided with V-shaped recesses 19, for the reception of the beads 15. In Fig. 4, the cells 17 are arranged in close relation, their portions 18 contacting. Each cell is provided with inwardly folded radial portions 20, which divide the cell into an inner radial portion 21 and outer radial portions 22. The bead engaging portion 18 is secured to the inner radial portion 21 only. It is thus seen, that should any one cell collapse, upon being punctured, the space thus provided, will be filled by the expanding circumferentially of the two adjacent cells, the outer radial portions 22 thereof moving circumferentially into such space, and filling the same. The lateral movement of the outer radial portions 22 is rendered possible by the inwardly folded portions 20. The invention is in no sense restricted to primarily arranging the cells in close relation, with their bead engaging portions 18 contacting, as these portions may be arranged in spaced relation, the several cells expanding circumferentially, upon inflation, to completely fill the casing.

The several cells (Figs. 1 to 10, inclusive) are provided with valve devices, one for each cell, each device embodying a preferably metallic valve tube 23, adapted for insertion within a radial opening 24, formed through the portion or heel 18, as shown. The opening 24 normally has a substantially smaller diameter than the tube 23, so that the tube will fit suitably tight therein, to prevent improper movement of the tube, but permit of its proper longitudinal movement, when desired. The tube 23 extends inwardly through screw-threaded openings 25, but has no screw-threaded engagement therewith. These openings are formed through overlapping portions 26 of the sections 27 of the rim 16. The numeral 28 designates a valve, preferably formed of suitably compressible rubber, primarily detachably held within the end of the tube 23. This tube has apertures 29, at the end of the valve 28, and these apertures are uncovered when the tube is in the inner position, thereby permitting of the entrance of compressed air into the cell. A flexible pull element 30, such as a wire, cord or the like, passes through the valve 28, which is preferably molded about the same. The flexible element 30 is anchored to a cap 31, preferably tapering away from the tube 23. This cap engages the inner end of the valve 28, and extends radially beyond the valve and tube 23, for a slight distance, to engage with the wall of the opening 24 or heel 18. The flexible element 30 extends within the tube 23 and projects beyond the rim 12.

As shown in Fig. 8, the numeral 32 designates a plurality of radial inflating tubes, each of which, Fig. 7, is preferably provided at its outer end with a coupling 33, exteriorly threaded, to engage within the interior threaded end 34 of the valve tube. The coupling 33 may be equipped with a check valve 35, opening to admit compressed air into the valve tube, but to prevent the escape of air therefrom. The invention is in no sense restricted to the provision of this check valve, which may be omitted, if desired. The inflating tubes 32 lead to a central chamber 36, and receive compressed air therefrom, as clearly shown in Fig. 9. This central chamber has a coupling 37, preferably equipped with a check valve 38, which opens to admit compressed air into the chamber 36. A hose 39 is connected with the coupling 37 and is connected with a pump 40, of any well known or preferred type.

In Fig. 10, I have shown an annular inflating chamber 41, having radial tubes 42 connected therewith, and adapted for connection with the valve tubes 23, in a similar manner to the inflating tubes 32, a check valve (not shown) being connected in each tube 42, corresponding to the check valve 35, and for the same purpose. A check valve (not shown) may also be connected in the hose 43, which is connected with the annular chamber 41, and with the pump 44.

Attention is called to Figs. 1 to 11, inclusive, and to the fact that the heel 18 of the cell has no permanent opening 24 formed therein, but this heel is normally or before the cell is inflated, imperforate. The numeral 23' designates a valve tube, adapted for insertion through the openings 35 in the rim sections 27. The forward end of this valve tube is covered by a tapered or pointed cap 24', adapted to be forced through the heel 18, providing an opening for the valve tube, as shown in Fig. 13. Openings 25' are provided beneath the tapered end or cap 24', for the passage of compressed air, Fig. 12. The outer end of the valve tube 23' is screw-threaded, for connection with the coupling 33, connected with the tube 32, so that the cell may be inflated.

The operation of the first form of cell, in Figs. 1 to 5, inclusive, is as follows:

The cell 17 is arranged within the tire casing 14, as shown in Fig. 1, and the opening 24 through the heel 18, is in alinement with the openings 25. The valve tube 23, with valve 28 therein, is passed through the openings 25, and forced through the opening 24, until the valve tube assumes a position shown in Fig. 2, with openings 29 uncovered. Compressed air is now supplied through the tube 32 and enters the interior of the cell. When the cell is properly inflated, the tube 23 is drawn outwardly slightly, to cover the apertures 29 with the wall of the opening 24, and thus prevent the escape of the compressed air. The hose 32 may now be disconnected from the valve tube, and further outward movement of the valve tube brings the tapered cap 31 in engagement with the heel 18, the valve 28 being deposited in the inner end of the opening 24, Fig. 3, upon the removal of the valve tube. In this manner the opening 24 is tightly closed.

In the operation of the form of cell shown in Figs. 11 to 13, inclusive, the valve tube 23' is forced through the imperforate heel 18, Fig. 11, until the apertures 25', Fig. 12, are arranged within the cell. Compressed air is now supplied to the cell, and when properly inflated, the valve tube is drawn outwardly slightly, covering the apertures 25' by the heel 18. The hose 32 may now be disconnected from the valve tube, and a pump (not shown) containing a liquid or plastic rubber cement connected with the valve tube, and this cement supplied to the interior of the valve tube. The cement will escape through the apertures 25', as the valve tube is gradually withdrawn, and serve to cement the walls of the opening in the heel, forming a seam 18'. When the valve tube is removed the heel 18 is again imperforate.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, I claim:

1. In a tire of the character described, a tire casing, a plurality of cells arranged within the tire casing, each cell being provided at its inner portion with an integral heel to be arranged between and engage with the beads of the tire casing, and inflating means carried by the heel.

2. In a tire of the character described, a tire casing, a plurality of cells arranged within the tire casing, each cell being provided at its inner portion with an integral heel provided upon its opposite sides with substantially V-shaped recesses to receive the beads of the tire casing, and inflating means carried by the heel.

3. In a tire of the character described, a tire casing, a plurality of cells arranged within the tire casing, each cell having a heel provided with an opening, a valve tube held within the opening and provided with apertures, and a valve detachably connected with the inner end of the valve tube and adapted to be held within the opening of the heel when the valve tube is removed from said opening.

4. In a tire of the character described, a tire casing, a plurality of cells arranged within the tire casing, each cell having a heel provided with an opening, a valve tube held within the opening and provided near its inner end with apertures, a valve adapted to be inserted within the inner end of the valve tube, and adapted to be held within the opening of the heel upon the removal of the tube from said opening, and a flexible element connected by the valve and extending within the valve tube.

5. In a tire of the character described, a tire casing, a plurality of cells arranged therein, each cell having radial folds forming an inner radial portion and outer radial portions, said inner radial portion having a heel integral therewith, said heel being separate from the outer radial portions, and means to inflate each cell.

6. In a tire of the character described, a tire casing, a plurality of cells arranged therein, each cell having a radial fold forming a plurality of radial portions, one portion being circumferentially movable with relation to the other portion, a heel carried by one portion and separate from the other portion, and means for inflating each cell.

7. In a tire of the character described, a tire casing, a plurality of cells arranged therein, each cell having a radial fold forming a plurality of radial portions, one portion being circumferentially movable with relation to the other portion, a heel carried by one portion to engage with the beads of the casing, and inflating means extending through each heel.

8. In a tire of the character described, as a sub-combination, a cell having a radial fold forming a plurality of radial portions which are relatively circumferentially adjustable, and a heel carried by one portion and arranged between the beads of the tire.

9. In a tire of the character described, as a sub-combination, a cell having a relatively thick heel, a valve tube adapted to extend through the relatively thick heel and provided near its inner end with apertures, said apertures being adapted to be uncovered when the valve tube is in the inner position and to be covered by the walls of the heel when the valve tube is drawn outwardly, and a valve carried by the inner end of the valve tube.

10. In a tire of the character described, as a sub-combination, a cell having a relatively thick heel provided with a radial aperture, a valve tube adjustably mounted within the aperture and provided near its inner end with apertures, the apertures of the valve tube being adapted to be uncovered when the valve tube is in the inner position and to be covered by the wall of the heel when the valve tube is moved outwardly sufficiently, and a valve removably mounted within the inner end of the valve tube and adapted for insertion within the aperture of the heel.

11. In a tire of the character described, as a sub-combination, a cell having an aperture in its inner portion, a perforated valve tube adapted for movement in the aperture, a valve held within the inner end of the tube and having a cap extending laterally beyond the valve tube, and a flexible element secured to the valve and extending through the tube.

12. In a tire of the character described, as a sub-combination, a cell having a heel, a valve tube having a tapered cap at its forward end and adapted for insertion through the heel, said valve tube having apertures near its forward end.

13. In a tire of the character described, as a sub-combination, a cell having a heel provided with an opening, a valve tube arranged within the opening and having its forward end covered by a cap, said valve tube being provided near the forward end with apertures, said apertures being uncovered when the valve tube is in the inner position, and adapted to be covered by the wall of said opening when the valve tube is moved outwardly.

In testimony whereof I affix my signature in presence of two witnesses.

WILLIAM H. RICHARDS.

Witnesses:
B. L. ARMSTRONG,
N. FRED McMILLAN.